United States Patent [19]

Clark et al.

[11] Patent Number: 5,686,998

[45] Date of Patent: Nov. 11, 1997

[54] SYSTEM FOR ADJUSTING COLOR INTENSITY OF NEIGHBORING PIXELS

[75] Inventors: Jeffery J. Clark, Tigard; Brian G. Crosby, Tualatin; Bo Lewendal, Beaverton; Gregory P. Thornton, Tigard, all of Oreg.

[73] Assignee: Tektronix, Inc., Wilsonville, Oreg.

[21] Appl. No.: 453,330

[22] Filed: May 30, 1995

Related U.S. Application Data

[62] Division of Ser. No. 919,864, Jul. 27, 1992, abandoned.

[51] Int. Cl.$^6$ .............. H04N 1/40; H04N 1/46; G01D 15/10
[52] U.S. Cl. .......... 358/296; 358/456; 358/503; 358/534; 347/188
[58] Field of Search .............. 358/298, 296, 358/456, 501, 503, 530, 534; 347/171, 172, 188; 395/108; 382/205, 254, 270, 272

[56] References Cited

U.S. PATENT DOCUMENTS

| | | | |
|---|---|---|---|
| 4,691,211 | 9/1987 | Brownstein | 346/76 |
| 4,969,052 | 11/1990 | Ishida et al. | 358/457 |
| 5,031,050 | 7/1991 | Chan | 358/298 |
| 5,032,903 | 7/1991 | Suzuki et al. | 358/75 |
| 5,113,454 | 5/1992 | Marcantonio et al. | 382/27 |
| 5,216,951 | 6/1993 | Yokoyama et al. | 101/128.4 |
| 5,231,677 | 7/1993 | Mita et al. | 382/22 |
| 5,243,444 | 9/1993 | Fan | 358/456 |

*Primary Examiner*—Eric Frahm
*Attorney, Agent, or Firm*—Ralph D'Alessandro; Charles F. Moore

[57] ABSTRACT

A method of printing an image onto a substrate includes the steps of determining a difference in intended color intensity between a first pixel and a second pixel; adjusting the intended color intensity of the first pixel based on the determined difference; and depositing a colorant onto the substrate at the first pixel at the adjusted intended intensity, so as to enhance the appearance of the image on the substrate. The current system has particular utility in enhancing the appearance of fine images such as one pixel wide, vertical and diagonal lines in a printing system which utilizes printhead heating elements that are larger in the vertical direction than in the horizontal direction.

25 Claims, 6 Drawing Sheets

☐ = 0

▨ = 15

☐ = 0

▨ = 15

☐ = 0

▨ = 15

FIG. 5A  ☐ =0    ▨ =15
FIG. 5B  ☐ =0   ▨ =7.5   ▨ =15
FIG. 6  ☐ =0   ▨ =15
FIG. 9A
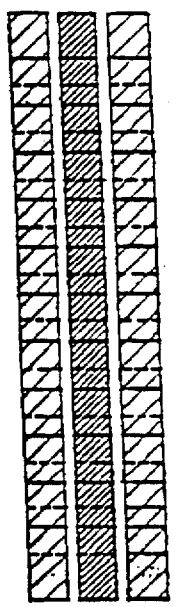
☐ = 0
▨ = 1
▨ = 15
FIG. 9B
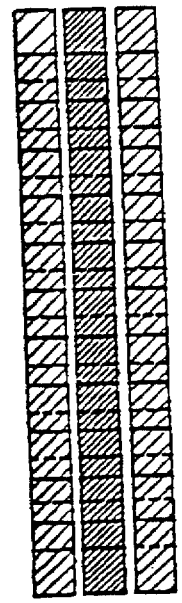
☐ = 0
▨ = 8
▨ = 15

SYSTEM FOR ADJUSTING COLOR INTENSITY OF NEIGHBORING PIXELS

This is a divisional of application Ser. No. 07/919,864 filed Jul. 27, 1992 now abandoned.

1. Field of the Invention

This invention relates to a system and method for enhancing the visual appearance of a fine image, such as a thin line, during printing. More specifically, the invention relates to improving the appearance of such an image in an intensity-variable type printing system utilizing pixels which are larger along a first axis than along a second axis.

2. Description of the Prior Art

Intensity-variable printing is, for the purposes of this document, defined as any type of printing in which colorant may be deposited on a base unit area, or pixel, in more than one intensity or degree of dilution. Diffusion printing, which is defined as including both common dye-diffusion and sublimation dye printing techniques, is one type of intensity-variable printing. Other intensity-variable printing techniques may include continuous ink jet printing, variable spot-sized phase change ink jet printing, variable dot electrophotography, variable dot thermal transfer printing, laser-induced dye diffusion transfer processes, dry silver technology and photographic printing, as well as others.

Dye diffusion printing involves the transfer of a dye colorant from a carrier, such as a polymer ribbon, onto a specialized substrate surface, such as a polyester sheet or a coated sheet of ordinary paper, in a controlled manner to generate an image. A thermal transfer print engine having an array of electrically actuatable heating elements is typically positioned so that the ribbon is juxtaposed between the printhead elements and the substrate. The amount or intensity of dye deposited at a single location or pixel on the substrate can be varied by adjusting the electrical input to the printhead elements. When one or more of the printhead elements is heated, the dye/carrier structure is heated to a temperature sufficient to cause migration of a commensurate amount of dye to the substrate. By using a ribbon or ribbons having the three primary or subtractive colors, or those colors plus black, highly subtle colorant gradations may be achieved on the substrate. Images of near photo quality have been produced using dye diffusion technology.

One characteristic of print heads that are used in sublimation dye printing, diffusion dye printing or the like is that the height of each print head heating element is larger than its width. In other words, each print head heating element is rectangular, rather than square. For example, the pixel shape on Sharp Electronics Model JX561 print head is a rectangle having a height to width ratio of approximately 2 to 1.

This hardware characteristic creates some problems during printing. For example, as may be seen in FIG. 1, vertical single-pixel lines are noticeably thinner than horizontal single-pixel lines. To compensate for the height of the rectangular heating elements, a portion of the two vertically adjacent pixels is overlapped as shown in FIG. 1. The dotted line shows the bottom of the rectangular heating element. The overlapping corrects some of the distortion. For example, 3 pixels-by-3-pixels square is achieved by the partial vertical overlap without further correction. A space between horizontal heating elements does not cause any visible break in the printed horizontal line. Diffused dye from the adjacent heating elements diffuses and closes the gap on the substrate. However, this correction does not help single-pixel lines. Diagonal single-pixel lines are also affected by such a print head and tend to appear jagged and inconsistent. Consequently, small point size text tends to lose definition due to the rectangular-shaped printhead elements.

Furthermore, there are thermal issues that make it difficult for the printer to securely deposit a single pixel which is isolated from the next horizontal pixel. When only one printhead element is heated, rapid dissipation of heat from that element to adjacent structure on the printhead and to the carrier ribbon sometimes causes insufficient heating of the ribbon to induce the intended amount of colorant deposition. Since the print head elements are arranged as a horizontal linear array horizontally isolated pixels will not be protected against such heat loss effects, even when the desired image requires a vertically adjacent pixel to be printed upon.

SUMMARY OF THE INVENTION

Accordingly, it is an object of the invention to provide a system and method which is adapted to compensate for the visual distortions of a fine image, such as one pixel-wide lines, small size text and isolated single pixels, which is printed by a printhead having rectangular heating elements.

It is an object of one aspect of the invention to provide an enhanced visual appearance of the fine images so that they will appear as wide as the longest edge of the rectangular heating elements.

It is another object of the invention to prevent poor printing quality which might otherwise result from rapid dissipating of heat from the heating elements when horizontally isolated pixels are being printed.

It is yet another object of the invention to limit such enhancement, so that the enhancement does not result in unwanted distortion of the image.

To achieve the above and other objects of the invention, a method of printing an image onto a substrate may include the steps of determining a difference in intended color intensity between a first pixel and a second pixel; adjusting the intended color intensity of the second pixel based upon the difference in the above step; and depositing a colorant onto the substrate at the first pixel and at the second pixels at the adjusted intended intensity, thereby enhancing the appearance of the image on the substrate.

A method of printing a minute image onto a substrate using a rectangular print head element according to a second aspect of the invention may include the steps of selecting a subset of contiguous pixels; determining if a difference in color intensity between a first of the contiguous pixels and a second of the contiguous pixels is above a predetermined value; adjusting the color intensity of the second pixel; repeating the above steps until all pixels are examined; and depositing a colorant onto the substrate according to the adjusted color intensities, whereby the deposited color according to the adjusted color intensities will compensate for distortion caused by the rectangular print head element and enhance an appearance of an image on the substrate.

A system of printing an image on to a substrate according to the third aspect of the invention may include a print controller which determines a difference in color intensity between a first pixel and a second pixel; which adjusts the color intensity of the second pixel based upon the difference; and which sends control signals instructing the print head to deposit a colorant on to the first and second pixels on the substrate according to the adjusted color intensity, thereby enhancing the appearance of the image on the substrate.

A system of printing a minute image on to a substrate using a rectangular print head element according to a fourth aspect of the invention may include a print controller which selects a subset of contiguous pixels; which determines if a difference in color intensity between a first of the contiguous pixels and a second of the contiguous pixels is above a predetermined value; which adjusts the color intensity of the second pixel; and which sends control signals instructing the print head to deposit a colorant on to the substrate according to the color intensity, whereby the deposited color according to the adjusted color intensity will compensate for a distortion caused by the rectangular print head element and enhance the appearance of the image on the substrate.

A method of operating a printing apparatus comprising a plurality of heating elements adapted to be juxtaposed to a carrier comprising a colorant for printing on a substrate according to fifth aspect of the invention may include the steps of determining a difference in color intensity between a first pixel and a second pixel; adjusting the color intensity of the second pixel based upon the difference in the above first step; and energizing a set of heating elements corresponding to the position of a colorant to be applied on to the substrate according to the color intensity, whereby the deposited color according to the adjusted color intensity will enhance the appearance of the image on the substrate.

An apparatus for printing an image on to a substrate according to a fifth aspect of the invention may include a print controller which determines a difference in color intensity between a first pixel and a second pixel; which adjusts said color intensity of the second pixel based upon the difference; and which sends control signals instructing the print head to energize a set of heating elements corresponding to the position of a colorant to be applied on to the substrate according to the adjusted color intensity, whereby the deposited color according to the adjusted color intensity will enhance an appearance of the image on the substrate.

The invention also embraces printing systems and printed products which correspond to the inventive methods.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 5A is a diagram of horizontally isolated pixels that are apart by more than one pixel.

FIG. 5B illustrates an enhancement over the horizontally isolated pixels as shown in FIG. 5A according to a preferred embodiment of the invention.

FIG. 6 is a diagram of horizontally isolated pixels that are apart by only one pixel, and this pattern of pixels is not enhanced by a preferred embodiment of the invention.

FIG. 9A illustrates an existing three-pixel-wide vertical line whose outer columns of the pixel have a lighter color intensity.

FIG. 9B shows an enhancement of the three-pixel wide vertical line shown in FIG. 9A by providing a more desirable contrast in color intensity between the surrounding and center columns of pixels.

DETAILED DESCRIPTION OF THE PREFERRED EMBODIMENT

Figure 1:
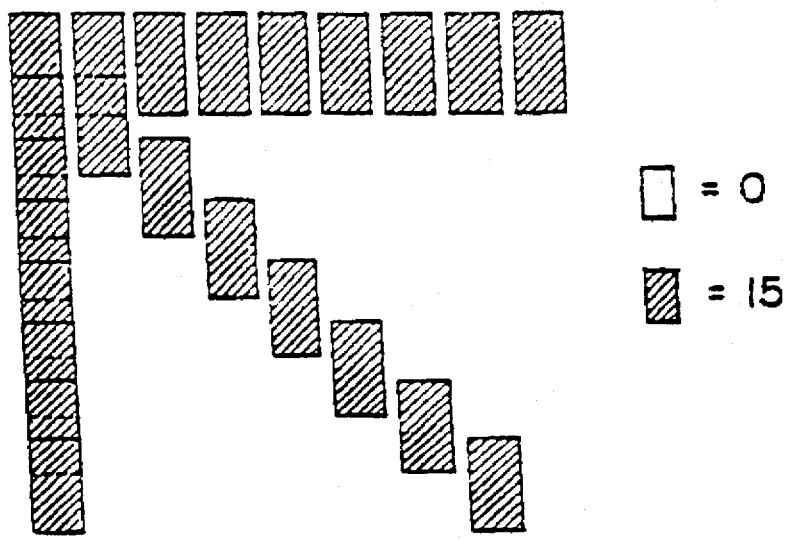
FIG. 1 is a diagram illustrating a visual distortion of lines printed by a printhead with rectangular heating elements.

Referring now to the drawings, wherein like reference numerals designate corresponding structure throughout the views, and referring in particular to FIG. 1, one horizontal line, one vertical line and one diagonal line are depicted as printed by the printhead that has rectangular heating elements. Such heating elements are activated to melt dye such as diffusion dye or sublimation dye to deposit the dye on the surface of a substrate. For the purpose of this document, the pixel is an abstract concept which refers to the extent of an area where dye is deposited by one heating element. Any image is constructed by printing combinations of single pixels, and each pixel has an identical rectangular shape with a substantially 2 to 1 ratio between the height and the width. Because of this ratio, the single-pixel-wide vertical line in FIG. 1 appears thinner than a single-pixel-wide horizontal line. A single-pixel-wide diagonal line also appears inconsistent due to the rectangular pixel. These visual distortions are not limited to the above-described graphical primitives, but are also manifested in more complex graphics such as small size font. The legend on the side shows that the original line has the color intensity value of 15, while the background has the color intensity value of zero.

Figure 2A:
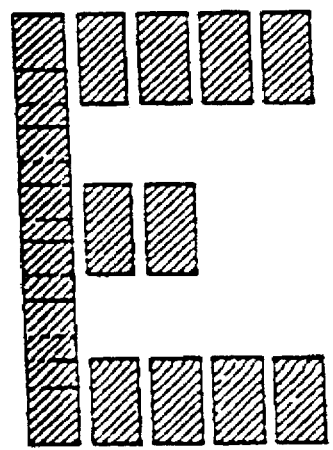
FIG. 2A is a diagram of a letter "E" printed by the same rectangular heating elements.
Figure 2B:
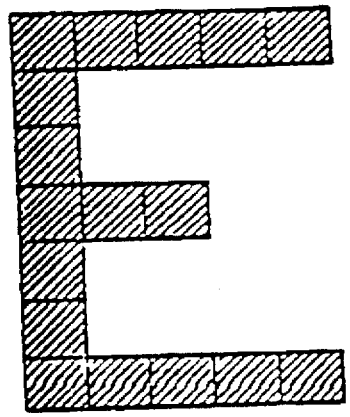
FIG. 2B is a diagram of a letter "E" printed by square heating elements and has the same number of pixels as FIG. 2A.

Referring now to FIG. 2A, a letter "E" looks more unproportional than a normal counterpart, FIG. 2B. Although the letter "E" in FIG. 2A has the same number of pixels as FIG. 2B, the letter "E" in FIG. 2A appears to have thicker horizontal line segments than the vertical line segment. The letter "E" as shown in FIG. 2B, however, will lose its proportion when it is printed by a printhead with non-square heating elements. It is an object of the invention to solve the above described problems in intensity-variable printing systems. The legend on the side shows that the original line has the color intensity value of 15, while the background has the color intensity value of zero.

By using intensity-variable printing technology, it is possible to create a different shade of color by varying the amount of deposited dye on the substrate surface. Conceptually speaking, to make the single-pixel vertical line appear as wide as the single-pixel horizonal line, an additional lighter color single-pixel line is juxtaposed next to one or more, and preferably both, sides of the single-pixel vertical line.

Figure 3:
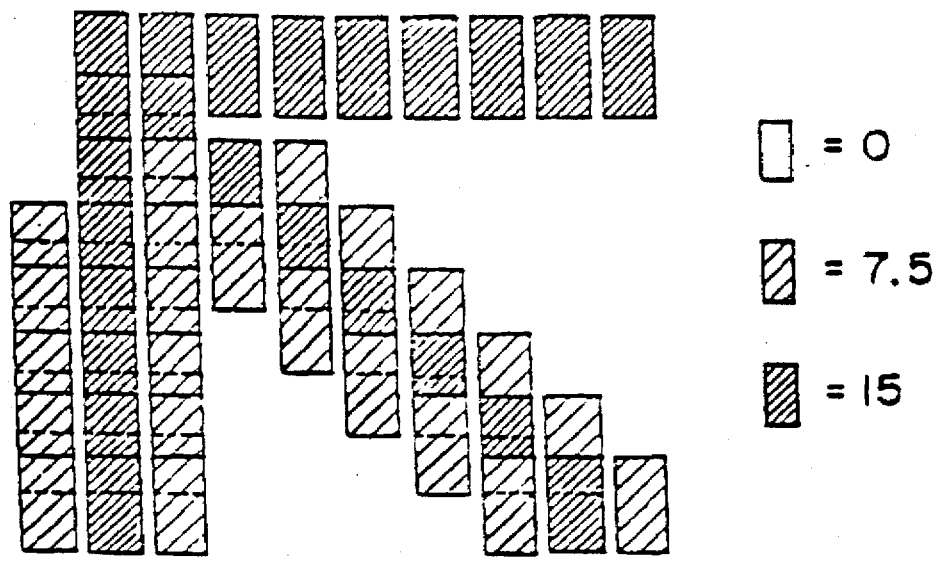
FIG. 3 illustrates an enhancement of the vertical and diagonal lines shown in FIG. 1, according to a preferred embodiment of the invention.

Referring to FIG. 3, the lines shown in FIG. 1 are compensated by the juxtaposed lines. The compensated vertical line in FIG. 3 is three pixels wide. An additional single-pixel-width line is juxtaposed on each side of the original single-pixel vertical line to enhance the width. The color intensity of the juxtaposed line is approximately half that of the original single-pixel vertical line. The legend on the side shows that the original line has the color intensity value of 15, while the background has the color intensity value of zero. The compensating line has the color intensity value of 7.5. However, since the new vertical line is now three pixels wide, the distortion caused by the 1:2 ratio rectangular pixels seems overcompensated, as may be seen in FIG. 3. However, the enhanced vertical line in the actual print appears as wide as a single-pixel-wide horizontal line, and each row in the enhanced vertical line now appears substantially square rather than rectangular, because of the lighter shade of the compensating adjacent pixels. Accordingly, a human will perceive the enhanced vertical line as being somewhat narrower than it actually is.

Still referring to FIG. 3, the diagonal line is also compensated for, according to a preferred embodiment of the invention. One pixel on each side of the pixels in the original single-pixel-wide diagonal line is added to enhance the width the appearance of the line. These juxtaposed pixels have approximately half the intensity of the original diagonal line. As for the vertical line, the enhanced diagonal line in the actual print appears as wide as a single-pixel-wide horizontal line, and each row now appears substantially square rather than rectangular.

Figure 4:
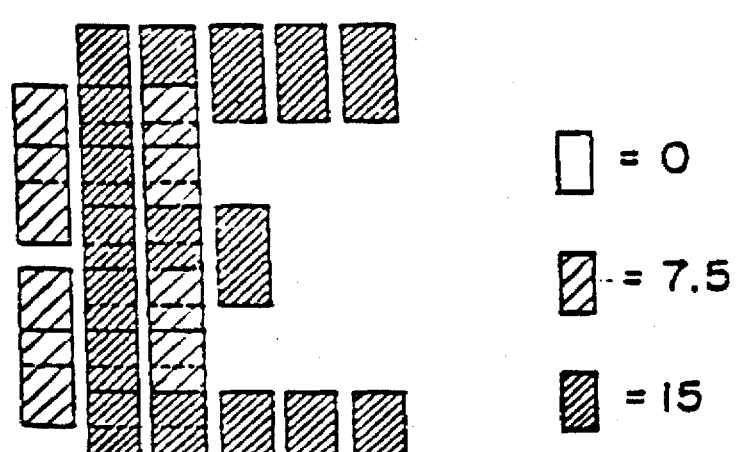
FIG. 4 illustrates an enhancement on the letter "E" shown in FIG. 2A according to a preferred embodiment of the invention.

Referring now to FIG. 4, the same enhancement is applied to the letter "E," as depicted in FIG. 2A. Some pixels have been added along some portions of the vertical line in FIG. 4. The intensity of these additional pixels is approximately half of that of the original pixels. The legend on the side shows that the original line has the color intensity value of 15, while the background has the color intensity value of zero. The compensating line has the color intensity value of 7.5. Although the enhanced character has not changed its overall height, it has gained a better proportion between the vertical and horizontal lines. As a result, the enhanced character appears aesthetically more acceptable. Such effect is more readily appreciated in some characters or numbers that have a sharp contrast between the vertical and horizontal line components. On the other hand, other characters such as "" (underscore) and "-" (hyphen) are not affected by the preferred embodiment of the invention.

Referring now to FIGS. 5A and 5B, similarly horizontally isolated single pixels as shown in FIG. 5A are enhanced by the above-described preferred embodiment of the invention. FIG. 5B shows the enhanced horizontally isolated single pixels. The legend on the side shows that the original pixels have the color intensity value of 15, while the background has the color intensity value of zero. The compensating pixels have the color intensity value of 7.5. These horizontally isolated single pixels are not visually distorted as much as the vertical single-pixel line. Because there is no comparison such as the case between the vertical and horizontal line, there is less need for correcting the appearance of the horizontally isolated single pixels. However, as discussed above, it is difficult for some printers to accurately deposit dye over a horizontally isolated single pixel area on the substrate due to heat dissipation from the single activated heat element. Thus, because of the thermal issue of the print head, the enhancement of the horizontally single pixel is also preferred.

On the other hand, a certain pattern such as shown in FIG. 6 should not be altered by the preferred embodiment of the invention so as not to destroy the original pattern. Accordingly, it is important that the enhancement should be somewhat limited so that it is applied only to the single-pixel-wide vertical and diagonal lines as well as certain horizontally isolated single pixels. For example, since these lines or patterns can be a part of some alpha-numeric characters or other symbols, an overenhancement may make these characters and symbols unrecognizable. Thus, the preferred embodiment of the invention enhances horizontally isolated single pixels only if they are separated by more than one pixel apart.

Figure 7:
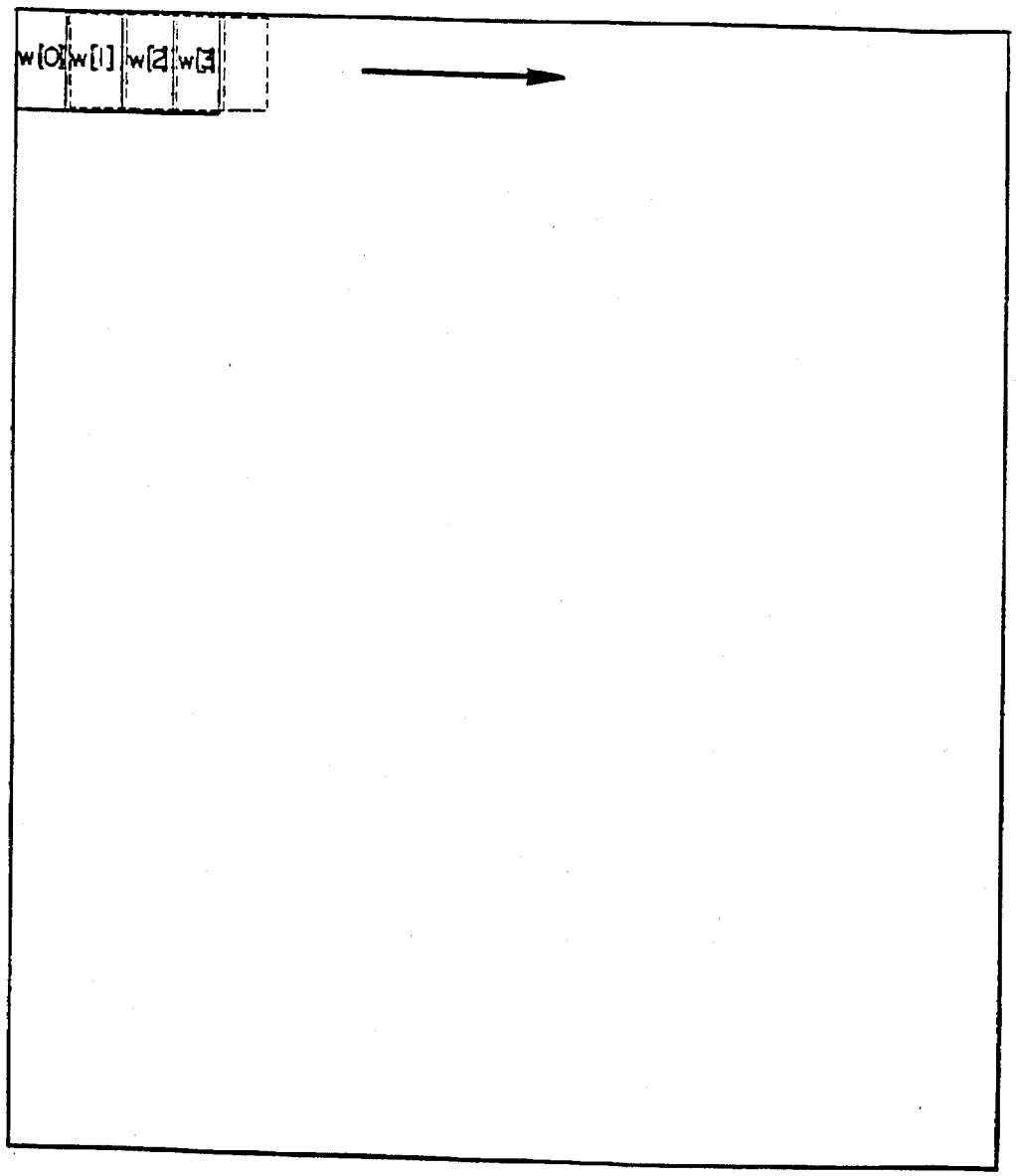
FIG. 7 shows a window which contains four pixels under examination for an enhancement according to one embodiment of the invention.

To accomplish the above described enhancement, according to one preferred embodiment of the invention, four horizontally contiguous pixels are examined at a time as shown in FIG. 7. Prior to printing, the values of the four pixels corresponding to the upper left corner of a substrate are loaded into a one-dimensional array called Window, which is designated by w[0] through w[3]. When these pixel values are examined and processed, Window is shifted by one pixel as shown by the dotted line in FIG. 7. When all the pixels in the same row are processed, Window is moved down to the next row and the process continues. This is repeated until all the pixels on the raster data array are considered.

Figure 8:
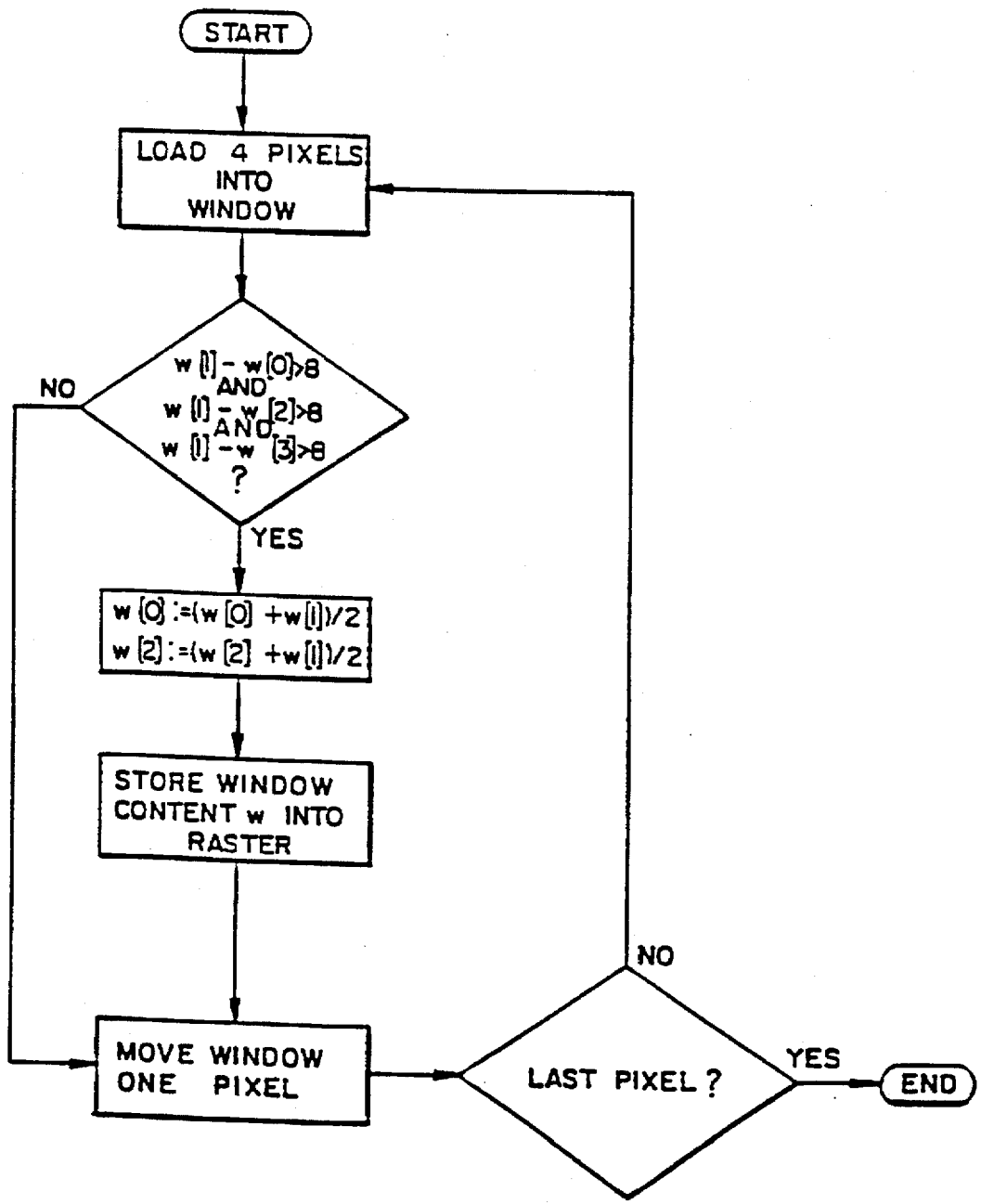
FIG. 8 is a flow chart depicting detailed processes of enhancing a fine image according to a preferred embodiment of the invention.

Referring now to FIG. 8, a flow chart of a software process for implementing the enhancement technique of the invention is further described in detail. After the four-bit (which in binary numbering can represent values of 0–15) data of the intensity level for each of the four horizontally contiguous pixels is loaded from the raster data array into Window, three conditions are tested. These tests include: 1) whether a difference in the pixel intensity value between the second and first pixels (w[1]–w[0]) is more than 8, 2) whether a difference in the pixel intensity value between the second and third pixels (w[1]–w[2]) is more than 8, and 3) whether a difference in the pixel intensity value between the second and fourth pixels (w[1]–w[3]) is more than 8. When all of the three conditions are satisfied, the first pixel intensity value is adjusted to an average of the first and second pixel intensity values as shown in w[0]:=(w[0]+w[1])/2. Similarly, the third pixel intensity value is adjusted to an average of the second and third pixel intensity values as shown in w[2]:=(w[2]+w[1])/2. On the other hand, if any of the three conditions is not met, no pixel intensity value is adjusted. Then the content of the Window array, w, is stored back into the raster data array, and the Window frame is moved to the right by one pixel or the beginning of the next row upon finishing the last four pixels on the row. Until all the pixel values in the raster data array are examined, the above described process is repeated.

Still referring to FIG. 8, the preferred embodiment may affect any pixel which is adjacent to a pixel having a pixel intensity value of 9 or greater, provided that the above described conditions are met. Accordingly, a single-pixel-wide vertical line with its pixel intensity value over 8 with a zero intensity background is enhanced to have 50% intensity pixels on both sides of the original line.

According to the preferred embodiment, the above-described enhancement is not limited to single-pixel-wide lines. For example, a vertical 3-pixel-wide line as shown in FIG. 9A may be also enhanced to one shown in FIG. 9B. FIG. 9A diagrammatically shows a 3-pixel-wide vertical line having the center pixel intensity of 15 and the adjacent pixel intensity of 1 with the background of zero intensity. Since the difference in the pixel intensity is more than 8 between these columns of pixels and the second column right to the center column of pixels has 0 intensity, all the three conditions described in reference to FIG. 8 are satisfied. Thus, the adjacent columns of the pixels will have the intensity level of 8 as shown in FIG. 9B after the enhancement. The enhancement of this kind is not necessarily spatial as discussed in reference to FIGS. 1–6, but intensity-related. Because of more desirable contrast of 50% intensity in FIG. 9B, the vertical line substantially improves its appearance so that its width is more likely perceived as that of the horizontal line. A similar type of enhancement can be applied to a situation where the difference in color intensity between a single-pixel line and the non-zero color intensity background is more than eight.

Figure 10:
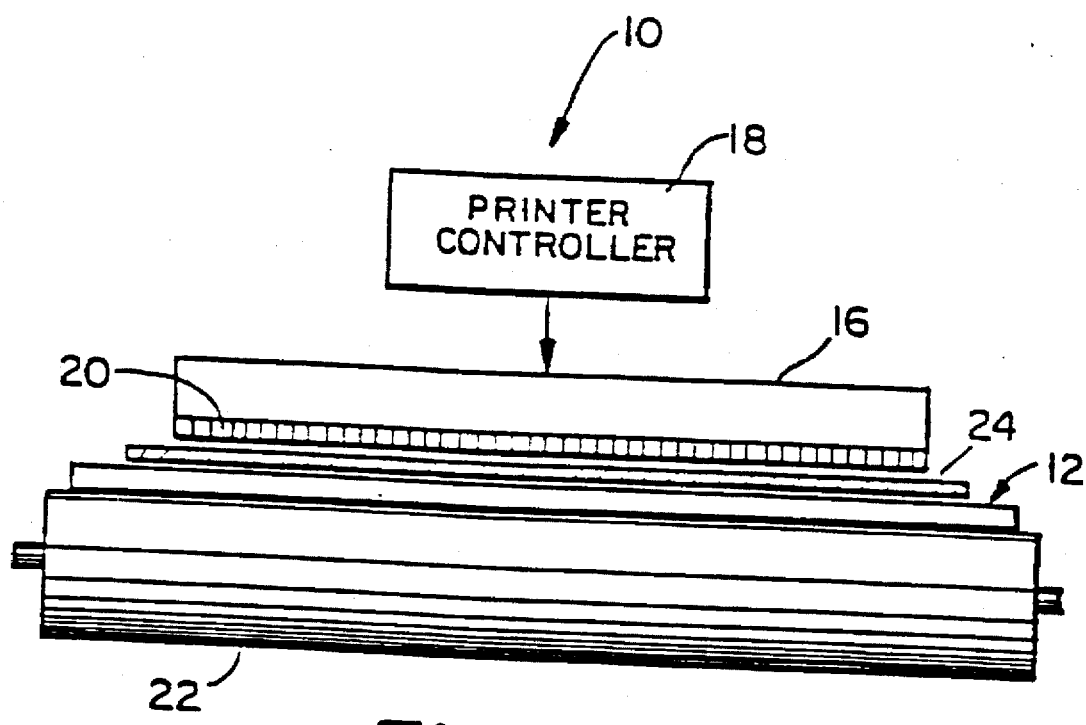
FIG. 10 is a schematic depiction of a thermal mass transfer printing system according to one embodiment of the invention.

FIG. 10 depicts an intensity-variable printing system 10 according to a preferred embodiment of the invention, which is preferably a diffusion-type printing system. System 10, designed to print an image on a substrate 12, includes a printhead element 16, which is responsive to commands from a printer controller 18. Printhead 16, according to the preferred embodiment of the invention, includes a linear array of heating elements 20, each of which may be heated in response to a command from the printer controller 18 by electrical resistance. Each heating element is intended to be aligned with discrete unit areas or pixels on the substrate 12. As will be appreciated by those skilled in the art, printer controller 18 includes a processor for selectively controlling print head 16 and heating elements 20 during the printing process. In accordance with the invention, the processor of printer controller 18 is controlled by software which implements the flow chart of FIG. 8 for providing intensity-variable printing.

A printer ribbon 24 is interposed between heating elements 20 and the substrate 12. Printer ribbon 24 includes a carrier layer, and a colorant layer containing a dye or colorant that is designed to migrate to the substrate upon application of heat from one or more of the heating elements 20. For dye-diffusion printing, the ribbon 24 contacts the substrate 12, and the colorant migrates into the substrate on a molecular level. For sublimation dye printing, there is no contact between the ribbon and the paper, and heat from the heating elements causes the colorant to sublimate, or phase from solid to gas, adjacent to the substrate, causing absorption in to the substrate 12. The surface of substrate 12 must be chemically compatible with the dye of colorant for printing to be successful, as is well known to those having ordinary skill in this technology.

System 10 is preferably a color printing system, and ribbon 24 preferably includes different portions, each having colorant impregnated thereon, which correspond to the three primary or subtractive colors. Optionally, a black portion may also be included. More than one ribbon 24 may also be used to accomplish transfer of the different colorants to the substrate, if desired.

A support roller 22 or equivalent surface is provided to support substrate 12 in parallel spaced relationship with respect to heating elements 20. By selectively controlling the heating elements 20 on printhead 16, printer controller 18 is constructed to control the placement of an image onto the substrate 12, as was described above in reference to FIGS. 7 and 8.

Preferably, printhead 16 is obtainable from Sharp Electronics Corporation as Model No. JX561. Preferably, ribbon 24 is the printer ribbon which is obtainable from Sharp Electronics under Model No. A4JX61R3T, which is a three color ribbon having a cyan component, a magenta component, and a yellow component. Alternative ribbon models may include Sharp Electronics Model No. A4JX61R4T, which is a four color ribbon having a cyan component, a magenta component, a yellow component, and a black component. A black ribbon, which may be used alone or in conjunction with the three or four color ribbons, is obtainable from Sharp Electronics under Model No. A4JX61RBT.

It is understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of printing an image onto a substrate using a rectangular print head with selectively actuatable heating elements that are longer along a first axis than along a second axis, comprising the steps of:

a. determining a first difference in intended color intensity between a second pixel and a first pixel in said image;

b. determining a second difference in intended color intensity between the second pixel and a third pixel in said image;

c. determining a third difference in intended color intensity between the second pixel and a fourth pixel in said image;

d. adjusting the intended color intensity of the first pixel and the intended color intensity of the third pixel if said first, said second and said third differences in intended color intensity each exceeds a predetermined threshold value; and e. depositing a colorant onto the substrate at the first pixel at the adjusted intended color intensity of the first pixel, and depositing a colorant onto the substrate at the third pixel at the adjusted intended color intensity of the third pixel, thereby enhancing the appearance of the image on the substrate and producing an image as wide as the first axis of the selectively activated heating elements.

2. A method as recited in claim 1, wherein said first and second pixels are adjacent.

3. A method as recited in claim 1, wherein step d comprises adjusting the intensity of the first pixel to an average intensity of the first and second pixels.

4. A method as recited in claim 1, wherein the first and second pixels are near an edge of the image.

5. A method as recited in claim 1, wherein steps a through e are repeated for a plurality of colors.

6. A method as recited in claim 1, wherein step e is performed by a diffusion-type printer.

7. A method as recited in claim 6, wherein said diffusion-type printer controls at least 16 levels of color intensity.

8. A method as recited in claim 1, wherein the color intensity of said third pixel is adjusted to an average intensity of said second pixel and said third pixel.

9. A method of printing a minute image onto a substrate using a print head element which is longer along a first axis than along a second axis, the image including a plurality of pixels; the method comprising the steps of:

a. selecting a subset of adjacent pixels;

b. determining if a first difference in color intensity between a second of said adjacent pixels and a first of said adjacent pixels is above a predetermined value;

c. determining if a second difference in color intensity between the second of said adjacent pixels and a third of said adjacent pixels is above the predetermined value;

d. determining if a third difference in color intensity between the second of said adjacent pixels and a fourth of said adjacent pixels is above the predetermined value;

e. adjusting said color intensity of said first pixel and said color intensity of said third pixel if said first, said second and said third differences in color intensity is each above said predetermined value;

f. repeating steps a through e until all of the plurality of pixels are examined; and g. depositing a colorant onto the substrate according to said adjusted color intensities, said colorant thereby compensating for distortion caused by the print head element and enhancing the appearance of the image on the substrate.

10. A method as recited in claim 9, wherein said subset is of horizontally adjacent pixels on the substrate.

11. A method as recited in claim 9, wherein said subset is of pixels on the substrate which are adjacent in a direction in which the shorter edge of the print head element extends.

12. A method as recited in claim 9, wherein said determinations of color intensity includes a comparison at least between immediately adjacent pixels.

13. A method as recited in claim 12, wherein at least one of said determinations of color intensity is further between said first pixel and said second pixel which is at least two pixels away from said first pixel.

14. A method as recited in claim 9, wherein the color intensity of said first pixel is adjusted to an average intensity of said first and second pixels.

15. A method as recited in claim 9, wherein said steps a through g are repeated for a plurality of colors.

16. A method as recited in claim 9, wherein said step g is performed by a diffusion-type printer.

17. A method as recited in claim 16, wherein said printer controls at least 16 levels of color intensity.

18. A method as recited in claim 9, wherein the color intensity of said third pixel is adjusted to an average intensity of said second pixel and said third pixel.

19. A method as recited in claim 9, wherein said first and said second pixels are near an edge of an image.

20. A method of operating a printing apparatus comprising a plurality of selectively actuatable heating elements that are juxtaposed to a carrier comprising a colorant for printing on a substrate, the heating elements being longer along a first axis than along a second axis, the method comprising the steps of:

a. determining a first difference in color intensity between a second pixel and a first pixel;

b. determining a second difference in color intensity between the second pixel and a third pixel;

c. determining a third difference in color intensity between the second pixel and a fourth pixel;

d. adjusting said color intensity of said first pixel and said color intensity of said third pixel if said first, said second and said third differences in color intensity each exceeds a predetermined threshold value; and e. energizing a set of said heating elements to deposit said colorant on the substrate according to said adjusted color intensity of said first pixel and said adjusted color intensity of said third pixel, said colorant enhancing the appearance of the image on the substrate by producing an image as wide as the first axis of the selectively actuatable heating elements.

21. A method as recited in claim 20, wherein said first and second pixels are adjacent.

22. A method as recited in claim 20, wherein the intensity of said first pixel is adjusted to an average intensity of said first and second pixels.

23. A method as recited in claim 20, wherein said first and said second pixels are near an edge of the image.

24. A method as recited in claim 20, wherein said steps a through e are repeated for a plurality of colors.

25. A method as recited in claim 20, wherein the color intensity of said third pixel is adjusted to an average intensity of said second pixel and said third pixel.

* * * * *